Jan. 13, 1953     S. J. KRULIKOSKI, JR., ET AL     2,625,652
PULSE FORMING CIRCUIT
Filed Feb. 8, 1950
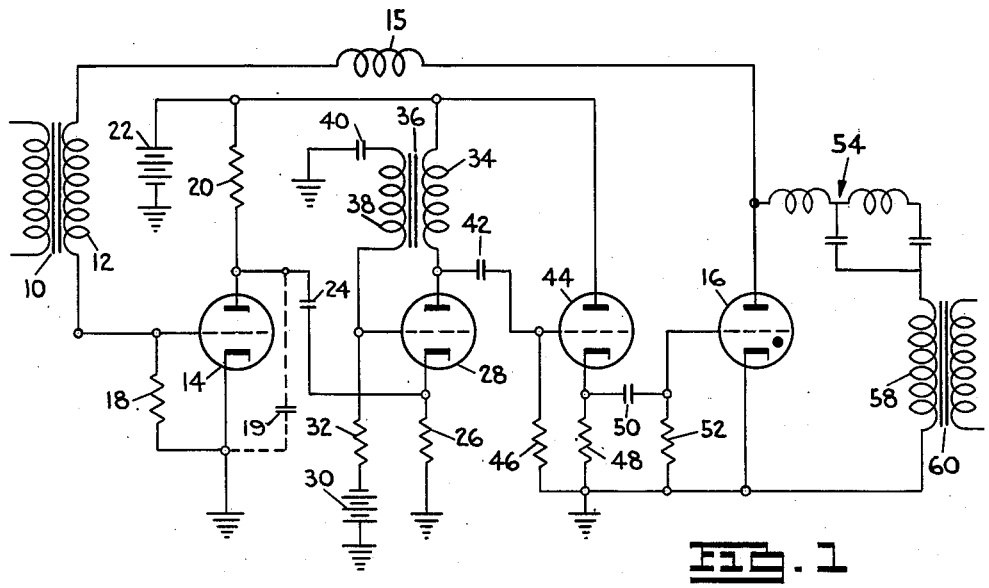
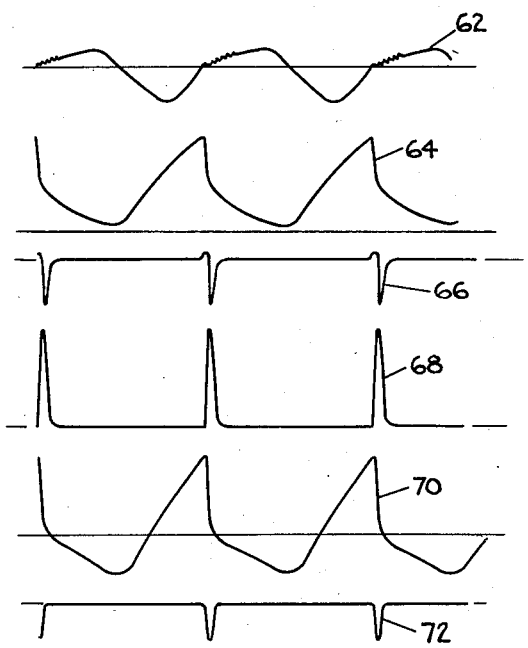
INVENTORS
STANLEY J. KRULIKOSKI, JR.
& DIXON T. JARVIS
BY
Ellsworth R. Roston
ATTORNEY Patented Jan. 13, 1953

2,625,652

UNITED STATES PATENT OFFICE 2,625,652

PULSE FORMING CIRCUIT

Stanley J. Krulikoski, Jr., Dearborn, and Dixon T. Jarvis, Detroit, Mich., assignors to Bendix Aviation Corporation, Detroit, Mich., a corporation of Delaware Application February 8, 1950, Serial No. 143,140

13 Claims. (Cl. 250—27)

This invention relates to pulse forming circuits and more particularly to a circuit for producing a pulse at a precise instant in a cycle of alternating voltage. The circuit is especially adapted to produce a pulse of optimum shape and to be free of any interference from outside sources.

In line type pulse forming circuits using inductance charging from a source of alternating voltage, a power supply charges, for a predetermined period of time, a network having a capacitive reactance at the charging frequency. The network is part of a series resonant circuit so that it is charged to a relatively high voltage during the charging period, which may comprise one or more cycles. At the end of the charging period, a switch is closed to permit the network to discharge through a load, producing a pulse across the load. The charge and discharge of the network are repeated at predetermined intervals to provide pulses having a definite repetition frequency. The pulses are utilized in many types of radar systems to obtain the direction and range of a distant object.

To close the switch, circuits now in use rely on a specific phase relationship between the applied voltage and the voltage on the network. Any changes in the frequency of the applied voltage cause this phase relationship to vary. As a result, changes in the frequency of the applied voltage prevent the network from discharging at the instant that it has been charged to a maximum value.

This invention employs a fixed phase relationship between the charging current and the voltage on the network to provide a pulse whose characteristics are substantially independent of the frequency of the applied voltage. The invention employs circuits which cause the switch to be closed at a time when the network has been charged to a maximum value. As a result, a pulse of maximum amplitude and optimum wave shape is produced.

An object of the invention is to provide a circuit operative from a source of alternating voltage and effective to produce a pulse having an optimum shape.

Another object of this invention is to provide a circuit of the above character for producing a pulse having a maximum amplitude regardless of any drift in the frequency of the applied voltage.

A further object is to provide a synchronizing pulse forming circuit utilizing a fixed phase relationship between the charging current and the voltage on the network.

Still another object is to provide a circuit of the above character for eliminating any effects which external noise may have on the shape of the pulse.

A still further object is to provide a circuit of the above indicated character which will require a minimum number of components, occupy a minimum amount of space, and operate efficiently and reliably.

Other objects and advantages of the invention will be apparent from a detailed description of the invention and from the appended drawings and claims.

In the drawings:

Figure 1 is a circuit diagram of one embodiment of the invention; and

Figure 2 illustrates curves of voltage and current waveforms at strategic points in the circuit shown in Figure 1.

In the embodiment illustrated in Figure 1, an alternating voltage is supplied by a power transformer 10. The secondary winding 12 of the transformer is connected between the grid of a conventional triode 14 and an inductance 15, which is in turn connected to the plate of a thyratron tube 16, which may be filled with hydrogen. A grid leak resistance 18 is provided between the grid and cathode of the tube 14 and the cathode is grounded. The tube has a distributed capacitance 19 between the plate and ground, as indicated by the broken lines. The plate of the tube is connected through a resistance 20 to the positive terminal of a suitable power source, such as a battery 22, the negative terminal of which is grounded. The plate is also connected to a differentiating circuit which includes a capacitance 24 and a resistance 26 in series.

One end of the resistance 26 is connected to the cathode of a triode 28 and the other end is grounded. A bias voltage is applied to the grid of the tube by the negative terminal of a suitable power source, such as a battery 30, the positive terminal of the battery being grounded. A resistance 32 is provided between the grid and the battery. The primary winding 34 of a transformer 36 is connected between the plate of the tube 28 and the positive terminal of the battery 22. One end of the secondary winding 38 is connected to the grid of the tube and the other end is connected through a capacitance 40 to ground.

The plate of the tube 28 is also connected through a coupling capacitance 42 to the grid of a triode 44. The grid of the tube is connected through a grid leak resistance 46 to ground, and the cathode is connected through a resistance 48 to ground. Voltage is applied to the plate from the battery 22.

The cathode of the tube 44 is connected through a capacitance 50 to the grid of the thyratron tube 16. A resistance 52 is provided between the grid and the cathode of the tube and the cathode is grounded. In addition to being connected through the inductance 15 to the secondary winding 12 of the transformer 10, the plate of the tube 16 is connected in series with a pulse forming network, generally indicated at 54, having a plurality of sections of inductances and capacitances, with the capacitance of each section having a value of C. With $n$ sections, the network has a capacitive reactance of approximately $$\frac{-j}{W_a nC}$$

at the frequency of the applied voltage, where $W_a$ is the angular frequency of the applied voltage. The network 54 is connected to the primary winding 58 of a pulse transformer 60 and the other end of the primary winding is grounded.

Alternating voltage is introduced by the voltage drop across the resistance 18 to the grid of the tube 14, which is a clipping amplifier. The tube is normally heavily conducting. During the negative half of the alternating voltage cycle, the tube is cut off and produces a positive pulse at the plate of the tube. The leading edge of the plate pulse is somewhat sloped because the capacitance 24 and the distributed capacitance 19 are being charged during this time. The distributed capacitance 19 is charged through a circuit which includes the battery 22 and the resistance 20. As the grid voltage approaches zero from a negative peak, the tube starts to conduct and the plate voltage falls. This causes the distributed capacitance 19 to discharge through the tube 14. Since the tube 14 presents a relatively low impedance to the capacitance 19 at this time, the capacitance discharges very rapidly. This discharge causes the plate current to increase and is instrumental in producing a sharply falling edge as the trailing characteristic of the plate pulse.

The pulse produced by the clipping amplifier is differentiated by the capacitance 24 and the resistance 26. The differentiator converts the leading edge of the pulse from the clipping amplifier into a relatively small pip and the trailing edge of the pulse into a relatively sharp and large triggering signal. The pip is not sufficiently strong to affect the performance of the tube 28 but the triggering signal turns the tube on, causing the voltage on the plate of the tube to fall sharply. This produces a negative pulse in the winding 34 of the transformer 36 and this negative pulse is inverted by the winding 38 and applied to the grid of the tube to produce a regenerative action in the tube. The tube 28 and the transformer 36 in effect constitute a blocking oscillator which amplifies and further sharpens the triggering pulse.

The triggering pulse from the blocking oscillator is passed through a cathode follower stage which includes the tube 44 and the resistance 48 and is then introduced to the grid of the thyratron tube 16. The tube 16 is normally cut off but the triggering pulse from the cathode follower stage causes the tube to conduct.

During the time that the tube 16 is cut off, the network 54 is being charged through a circuit which includes the secondary winding 12 of the transformer 10, the inductance 15, the network 54, the winding 58 of the pulse transformer 60 and the resistance 18. This circuit is tuned so that the network 54 will be charged in one cycle of applied voltage to a value much higher than the applied voltage. When the tube 16 starts to conduct, the network discharges through a circuit which includes the network, the tube 16 and the winding 58 of the pulse transformer 60. The discharge is short and heavy and produces an output pulse in the pulse transformer. This pulse may be used to modulate the output from a transmitter (not shown).

Since the network 54 has a capacitive reactance at the frequency of the applied voltage, the charging current leads the voltage on the network 54 by 90°. Therefore, the voltage on the network is at a maximum when the current through it is zero. This current also provides the bias on the grid of the tube 14 by passing through the resistance 18. As previously stated, the triggering pulse is formed when the bias on the grid of the tube 14 is zero. Since at this instant the charging current is also zero, the condenser is discharged at its maximum value, and this occurs regardless of the frequency of the applied voltage.

The above circuit also eliminates the effects of any noise which may occur in the first half cycle of the alternating voltage cycle. This noise is caused by shock oscillations which are produced when the network 54 is discharged. Sometimes this noise is strong enough to trigger intermediate stages during the interval between successive pulses, so that spurious trigger pulses are produced by these stages. These pulses, when introduced to the grid of the tube 16, cause the network 54 to be discharged before it has reached a maximum value. This invention prevents such undesirable network discharges from occurring by producing a sharply falling characteristic in the trailing edge of the pulse from the tube 14. This characteristic, when differentiated, causes signals to be formed and these triggering signals are introduced to the tube 28 to produce a heavy conduction in the tube. As a result, the tube 28 may be provided with a sufficiently large negative bias to prevent any noise signals from triggering it.

In Figure 2, curves are shown of the voltage waveforms at various points in the circuit shown in Figure 1. Curve 62 illustrates the waveform of the charging current as well as the waveform of the voltage on the grid of the tube 14, and curve 64 is a waveform of the voltage on the plate of the tube. As will be seen, the pulses formed at the plate have somewhat sloped leading edges and sharply falling trailing edges, the latter occurring when the grid voltage of the tube is passing in a positive direction through zero. The signals formed by differentiating the trailing edge of the plate pulses are shown in curve 66, and the triggering pulses introduced to the grid of the tube 16 are illustrated in curve 68. In curve 70, the charging and discharging of the network 54 are illustrated. Curve 72 shows the pulses which are formed in the pulse transformer 60 when the tube 16 breaks down to provide a discharge path for the network 54. An enlarged image of one of the pulses in the transformer 60 is illustrated in curve 74.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A pulse forming circuit, including, a source of alternating voltage, means for forming signals with sharp trailing edges, means for converting the trailing edges of the signals into sharply defined triggering pulses, means, including a network, connected to the voltage source to form a resonant charging circuit, the network being charged by the voltage source during the interval between pulses, and a switch connected to the resonant circuit, the switch being closed by the triggering pulse to provide a discharge path for the network.

2. A pulse forming circuit, including, a source of alternating voltage, means for converting the alternating voltage into signals having steep trailing characteristics, means for differentiating the trailing characteristics of the signals to produce sharply defined triggering pulses, means, including a network, connected to the voltage source to form a resonant charging circuit, and a switch connected to the resonant circuit and adapted to be closed by the triggering pulse to provide a discharge path for the network.

3. A pulse forming circuit, including, a source of alternating voltage, means for converting the wave shape of the alternating voltage into signals having sharply graduated trailing edges, means for converting the trailing edges of the signals into sharply defined triggering pulses, means for amplifying and further sharpening the triggering pulses, means, including a network, connected to the voltage source to provide a maximum charge on the network between triggering pulses, a gas-filled tube, and means for introducing the triggering pulses to the gas-filled tube to provide a conduction of the tube and a discharge path for the network.

4. A pulse forming circuit, including, a source of alternating voltage, means, including a network, connected to the source of alternating voltage to provide a resonant charging circuit, means for converting the alternating voltage into signals having a relatively shallow rising characteristic and a sharply graduated trailing characteristic, means operative to convert each sharply graduated trailing characteristic into a steeply spiked triggering pulse, and a gas-filled tube adapted to receive the triggering pulses to provide conduction therethrough, the tube being connected to the network to provide a discharge path for the network upon the formation of the triggering pulses.

5. A pulse forming circuit, including, a source of alternating voltage, a network, a resistance, means, including the network and the resistance, connected to the source of alternating voltage to form a resonant charging circuit, means connected to the resistance to form a triggering pulse at a predetermined instant in each cycle of alternating voltage, and a switch connected to the triggering means and the network to provide a discharge path for the network upon the formation of the triggering pulse.

6. A pulse forming circuit, including, a source of alternating voltage, a network, a resistance, means, including the network and the resistance in series, connected to the source of alternating voltage to form a resonant charging circuit, means connected to the resistance to form a triggering pulse at a predetermined instant in each cycle of alternating voltage, and a normally non-conducting gas-filled tube connected to the triggering means and the network to provide a discharge path for the network upon the formation of the triggering pulse.

7. A pulse forming circuit, including, a source of alternating voltage, a resonant circuit, including a network, connected to the source of alternating voltage to charge the network, a clipping amplifier for converting the alternating voltage into signals having a relatively shallow rising characteristic and a sharply graduated trailing characteristic, a differentiator operative to convert each sharply graduated trailing characteristic into a steeply spiked triggering pulse, and a gas-filled tube adapted to receive the triggering pulses to provide conduction therethrough, the tube being connected to the network to provide a discharge path for the network upon the forma- the formation of the triggering pulse.

8. A pulse forming circuit, including, a source of alternating voltage, a resonant circuit, including a network, connected to the source of alternating voltage to charge the network, a resistance connected in series with the voltage source and the network, a tube connected to the resistance for conduction at substantially zero current through the resistance, means operative upon the tube conduction to produce a triggering signal, and a switch connected to the network to provide a discharge path for the network upon the introduction of a triggering signal.

9. A pulse forming circuit, including, a source of alternating voltage, a resistance connected to the voltage source, means connected to the resistance and adapted to produce a triggering signal for a predetermined current through the resistance, a resonant circuit, including a network, connected in series with the resistance and the voltage source, and a switch connected to the network and the triggering means to provide a discharge path for the network upon the formation of each triggering signal.

10. A pulse forming circuit, including, a source of alternating voltage, means, including a resistance connected to the voltage source, for forming signals with sharp trailing edges, means for converting the trailing edges of the signals into sharply defined triggering pulses, means, including a network, connected to the voltage source and the resistance to form a resonant charging circuit, the network being charged by the voltage source during the intervals between pulses, and a switch connected to the network and the triggering means and adapted to be closed by each triggering pulse to provide a discharge path for the network.

11. A pulse forming circuit, including, a source of alternating voltage, a resistance connected to the source of alternating voltage, means connected to the resistance and adapted at a predetermined current through the resistance to convert the wave shape of the alternating voltage into signals having sharply graduated trailing edges, means for converting the trailing edges of the signals into sharply defined triggering pulses, means, including a network, connected to the voltage source and the resistance to provide a maximum charge on the network between triggering pulses, and a normally open switch connected to the network and adapted to be closed upon the introduction of each triggering signal to provide a discharge path for the network.

12. A pulse forming circuit, including, a source of alternating voltage, a resonant circuit, including a network and a resistance, connected to the source of alternating voltage to charge the network, a clipping amplifier connected to the resistance to convert the alternating voltage at a predetermined current through the resistance into signals having a relatively shallow rising characteristic and a sharply graduated trailing characteristic, a differentiator operative to convert each sharply graduated trailing characteristic into a steeply spiked triggering signal, and a normally open switch connected to the network and adapted to be closed upon the introduction of each triggering signal to provide a discharge path for the network.

13. A pulse forming circuit, including, a source of alternating voltage, a resonant circuit, including a network, connected to the source of alternating voltage to charge the network, a resistance conected in series with the voltage source and the network, a tube connected to the resistance for conduction at a predetermined current through the resistance, means operative upon the conduction of the tube to produce a triggering signal, and a normally non-conductive gas-filled tube connected to the network and the triggering means and adapted to conduct upon the introduction of each triggering signal to provide a discharge path for the network.

STANLEY J. KRULIKOSKI, Jr.
DIXON T. JARVIS.

REFERENCES CITED

The following references are of record in the file of this patent:

UNITED STATES PATENTS

| Number | Name | Date |
|---|---|---|
| 2,430,315 | Varnum | Nov. 4, 1947 |
| 2,511,595 | Laughren | June 13, 1950 |